April 11, 1933.  C. A. SCHACHT  1,903,689
SLIDING CASTER
Filed Nov. 25, 1931  2 Sheets-Sheet 1
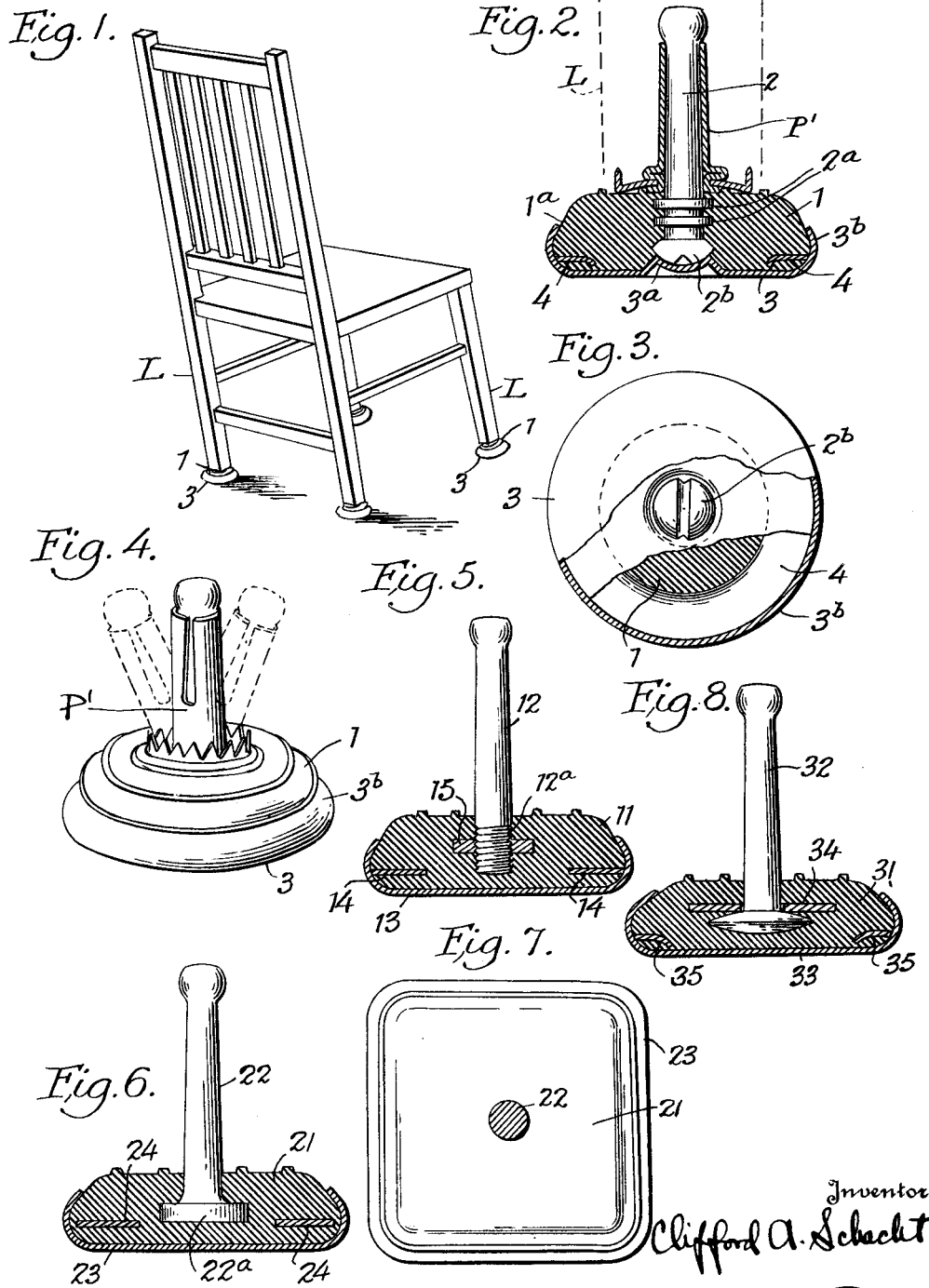

April 11, 1933. C. A. SCHACHT 1,903,689
SLIDING CASTER
Filed Nov. 25, 1931 2 Sheets-Sheet 2
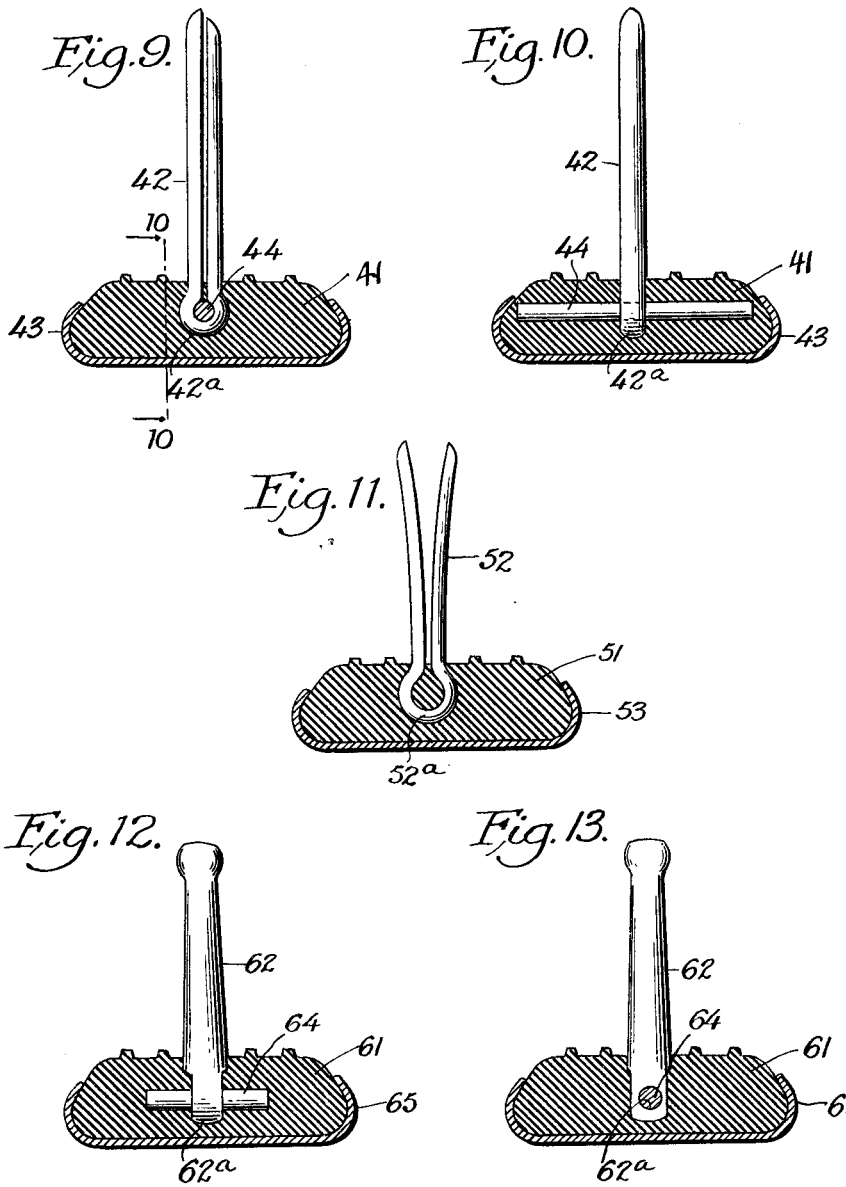

Patented Apr. 11, 1933

1,903,689

UNITED STATES PATENT OFFICE

CLIFFORD A. SCHACHT, OF HUNTINGTON, INDIANA

SLIDING CASTER

Application filed November 25, 1931. Serial No. 577,346.

This invention relates to sliding casters for chairs, beds, and other articles of furniture or the like, the present application being a continuation-in-part of my copending applications Serial No. 536,026, filed May 8, 1931; Serial No. 539,936, filed May 25, 1931; and Serial No. 565,621, filed September 28, 1931.

The principal object of the invention is to provide resilient sliding casters, economical to manufacture, adapted to be applied to furniture legs, said casters having a relatively flat resilient body with a slidable shell of hard surfaced material, and having caster pintles molded directly in the resilient body in such manner as to be permitted a yielding universal rocking movement due to the resiliency of the body, whereby when the article of furniture is tilted the universal rocking movement of the pintles will allow the sliding shell bases of the casters to remain flat on the surface of the floor at all times, thereby preventing the casters from scarring or otherwise injuring the floor or floor covering. The resilient body may moreover be provided with simple and efficient means for preventing the resilient body, after assembly in the shell, from being contracted sufficiently so as to be removable from the shell, said means however maintaining the center of the body soft and pliable, but rendering the edges of the body firm and radially non-compressible.

A further object of the invention is to provide novel sliding casters in which the pintles are connected to the shell by means of the yieldable or resilient body, whereby when the casters are placed on the furniture legs, the resiliency of the rubber body will compensate for any unevenness of the floor, and will also prevent rocking of the furniture due to inequalities in the lengths of the legs.

Other minor objects of the invention will be hereinafter set forth.
I will explain the invention with reference to the accompanying drawings which illustrate several practical embodiments thereof to enable others to adopt and use the same; and will summarize in the claims the novel features of construction, and novel combinations of parts, for which protection is desired.

In said drawings:—

Fig. 1 is a perspective view of a chair equipped with my novel casters, showing the chair tilted backwardly while the casters on the rear legs remain seated squarely on the floor surface. Fig. 2 is an enlarged vertical section through one form of caster with pintle and plug. Fig. 3 is a bottom plan view of the caster shown in Fig. 2 partly broken away. Fig. 4 is a perspective view of the caster shown in Fig. 2, illustrating the universal rocking movement of the pintle. Fig. 5 is an enlarged vertical section through a modification of the caster and pintle shown in Fig. 2. Fig. 6 is an enlarged vertical section through a further modified form of caster and pintle. Fig. 7 is a top plan view of the caster shown in Fig. 6 with the pintle 22 shown in section. Fig. 8 is an enlarged vertical section through a still further modified form of caster and pintle. Fig. 9 is a vertical section through a further modified form of caster. Fig. 10 is a vertical section on the line 10—10, Fig. 9, the resilient body structure being further cut away so as to expose the pintle and pintle attaching means. Fig. 11 is a vertical section through a further modified form of caster. Fig. 12 is a vertical section through a further modified form of caster. Fig. 13 is a vertical section through the caster shown in Fig. 12 taken at right angles to the pin 64.

The sliding caster shown in Figs. 1 to 4 inclusive comprises a flat resilient body 1 of molded rubber or other suitable yieldable material, said body being preferably circular and of substantial thickness, and having its edges rounded as at 1a. Molded into the center of the body 1 is a pintle 2 having spaced collars 2a formed thereon adjacent its lower end, and having a rounded head 2b on its lower end exposed through the lower face of the body 1 adapted to seat in a raised socket 3a formed in the slidable shell 3. When the body 1 is being molded, pintle 2 is placed in the mold (which corresponds with the shape of the shell 3) and then the raw rubber placed in the mold, and the pressure and heat will cause the rubber to flow between the collars 2a so that pintle 2 becomes inseparable from the body 1. The rocking motion of the pintle, illustrated in Fig. 4, is permitted by the flexibility of the rubber body 1, and the pintle 2 is normally maintained in vertical position while yieldably permitting universal rocking movement thereof.

Around the lower portion of the resilient body 1 is a cup-shaped shell 3 of metal, bakelite, glass, wood, or any other hard surfaced material which will slide without injuring the floor. Shell 3 is adapted to fit tightly around the lower portion of body 1, and is provided at its center with the raised socket seat 3a to accommodate the rounded head 2b of the pintle resting in the socket.

For the larger size casters, I preferably mold a metallic ring 4 in the lower portion of the resilient body 1 (Figs. 2 and 3), said ring 4 being disposed substantially in the lower face of the body adjacent its periphery, whereby when the body 1 is inserted in a partially formed metallic shell 3 and the sides of the shell contracted around the body, as at 3b, during the assembly of the parts, the body 1 will become permanently locked in the shell 3 since the ring 4 will prevent radial contraction or distortion of the edges of the body. The ring 4 however does not affect the resiliency of the central portion of the body. Instead of a metallic ring 4 a flat metal plate could be embedded in the body, or a canvas ply could be so embedded. For small size casters the rings might be omitted.

The shank of the pintle 2 may carry any type of plate or plug, as for instance, the plug P′, Fig. 2. By the above construction the pintle 2 is permitted a universal rocking motion with respect to the body 1 and shell 3, whereby when the chair or other article of furniture is tilted the shell 3 will remain seated squarely on the surface of the floor while the pintle 2 may readily assume the angularity of the furniture leg L.

The caster shown in Fig. 5 differs from that shown in Fig. 2 in that the pintle 12 does not extend entirely through the body 11, and has threads 12a on its lower end. The pintle 12 is molded in the rubber body 11 to cause the rubber to flow into the threads. If desired, a nut 15 may be screwed onto the threads of the pintle 12 before molding to secure firmer anchorage, but the nut 15 may be omitted. The shell 13 is similar to shell 3 of Fig. 2, except that no raised socket need be formed therein as the pintle 12 has no rounded head as 2b in Fig. 2. Also, the metallic ring 4 (Fig. 2) is replaced by a flat metallic ring or plate 14.

In Figs. 6 and 7 a further modification of the caster and pintle shown in Fig. 5 is illustrated, said figures illustrating a square type caster. Fig. 6 shows a flat flexible rubber body 21 with a pintle 22 molded in the body, the pintle having an enlarged head 22a which when molded in the body would keep the pintle from pulling through the body. The rocking motion of the pintle 22 is due to the flexibility of the body. The shell 23 is the same as in Fig. 5, except for the square shape, and the casters shown in Figs. 6 and 7 can be used effectively on office desks and furniture. The ring 4 (Fig. 2) is replaced by a stiff fabric or canvas ply 24.

In Fig. 8 a modification of the pintle shown in Figs. 5 and 6 is illustrated. Fig. 10 shows a molded resilient body 31 with a metal shell or casing 33. A pintle 32 and washer 34 are molded in the rubber. To make this caster the pintle 32 carrying the washer 34 is placed in the mold and then the rubber is placed in the mold, and when molded forms a solid unit. The rubber runs between the washer and the pintle base permitting the tilting motion. A ring 35 may be used, which ring is the same as ring 4 of Fig. 2, or the ring may be omitted for the smaller sizes of casters.

In the caster shown in Figs. 9 and 10, the pintle 42 has the form of a split cotter pin having its head 42a molded in the resilient body 41. Extending through the eye of the head 42a is a pin 44 likewise molded in the body 41, which pin preferably extends substantially entirely across the body 41, the ends thereof terminating close to the rolled edges of the shell 43, although the pin 44 may be of shorter length if desired. Pin 44 not only keeps the pintle from pulling out of the body while permitting universal movement in the body, but also by preventing distortion of the body 41 keeps the body from pulling out of the shell 43.

Fig. 11 shows a modified form of the caster shown in Fig. 9 in which the pin is omitted, but the pintle is a split cotter pin 52. The head or eye 52a of the pintle 52 is sufficiently enlarged so that during the molding of the body 51 the rubber will flow through the eye 52a and lock the head of the pintle 52 therein, while permitting the desired tilting or rocking motion of the pintle.

In Figs. 12 and 13 a further modified form of caster is shown in which the solid stem pintle 62 has a hole 62a drilled at one end for the passage of the pin 64, which pin may be relatively short as shown in Fig. 13, or may be extended similar to the showing in Fig. 10 terminating adjacent the shell 65. The pintle 62 and pin 64 are molded in the body 61, and the pin maintains the pintle in the body while permitting rocking or tilting movement of the pintle.

In each of the constructions shown in Figs. 9 to 13 the rubber during the molding process will flow around the pin and through the eyes of the pintle and will securely lock same in the rubber body while permitting the pintles to be rocked universally.

By the constructions shown in Figs. 5 to 13 inclusive, when the casters are placed on the furniture, if there should be any unevenness in the floor, or if the several furniture legs should be of slightly different lengths, the compressibility of the rubber body will compensate therefor, permitting the furniture to seat squarely upon the floor surface.

I claim:—

1. A sliding caster comprising a relatively flat resilient body of substantial thickness, a pintle molded in the body and adapted to pivot universally of the body, and a slidable shell for the body having its edges rolled around the body, said pintle comprising a cotter pin having its head molded in the body.

2. A sliding caster comprising a relatively flat resilient body of substantial thickness, a pintle molded in the body and adapted to pivot universally of the body, and a slidable shell for the body having its edges rolled around the body, said pintle comprising a cotter pin having its head molded in the body, and a pin extending through the head and molded in the body.

3. A sliding caster comprising a relatively flat resilient body of substantial thickness, a pintle molded in the body and adapted to pivot universally of the body, and a slidable shell for the body having its edges rolled around the body, said pintle comprising a cotter pin having its head molded in the body, and a pin extending through the head and molded in the body, the ends of said pin extending to points adjacent the edges of the shell.

CLIFFORD A. SCHACHT.